US011530333B2

(12) United States Patent
Han et al.

(10) Patent No.: US 11,530,333 B2
(45) Date of Patent: Dec. 20, 2022

(54) COATING COMPOSITION SYSTEM, THE PREPARATION METHOD, AND THE USE THEREOF

(71) Applicant: Akzo Nobel Coatings International B.V., Arnhem (NL)

(72) Inventors: Xiaoguang Han, Shanghai (CN); Junbiao Lu, Shanghai (CN)

(73) Assignee: Akzo Nobel Coatings International B.V., Amsterdam (NL)

( * ) Notice: Subject to any disclaimer, the term of this patent is extended or adjusted under 35 U.S.C. 154(b) by 328 days.

(21) Appl. No.: 16/470,514

(22) PCT Filed: Dec. 26, 2016

(86) PCT No.: PCT/CN2016/112126
§ 371 (c)(1),
(2) Date: Jun. 17, 2019

(87) PCT Pub. No.: WO2018/119582
PCT Pub. Date: Jul. 5, 2018

(65) Prior Publication Data
US 2019/0330494 A1    Oct. 31, 2019

(51) Int. Cl.
| | | |
|---|---|---|
| *C09D 183/04* | (2006.01) | |
| *C09D 5/00* | (2006.01) | |
| *B05D 1/00* | (2006.01) | |
| *B05D 5/00* | (2006.01) | |
| *B05D 3/00* | (2006.01) | |
| *C08G 77/12* | (2006.01) | |
| *C08G 77/20* | (2006.01) | |
| *C09D 5/16* | (2006.01) | |
| *C09D 7/40* | (2018.01) | |
| *C09D 167/00* | (2006.01) | |
| *C09D 133/00* | (2006.01) | |
| *C09D 163/00* | (2006.01) | |

(52) U.S. Cl.
CPC ............ *C09D 183/04* (2013.01); *B05D 1/00* (2013.01); *B05D 3/002* (2013.01); *B05D 5/00* (2013.01); *C09D 5/00* (2013.01); *C08G 77/12* (2013.01); *C08G 77/20* (2013.01); *C09D 5/002* (2013.01); *C09D 5/16* (2013.01); *C09D 5/1656* (2013.01); *C09D 5/1662* (2013.01); *C09D 5/1668* (2013.01); *C09D 5/1675* (2013.01); *C09D 5/1681* (2013.01); *C09D 5/1693* (2013.01); *C09D 7/40* (2018.01); *C09D 133/00* (2013.01); *C09D 163/00* (2013.01); *C09D 167/00* (2013.01)

(58) Field of Classification Search
CPC . C09J 175/06; B05D 3/02; B05D 1/00; B41C 1/10; C08F 16/14; C08G 77/26; C09D 183/04; B32B 27/40; A61K 6/10
See application file for complete search history.

(56) References Cited

U.S. PATENT DOCUMENTS

| | | | |
|---|---|---|---|
| 3,772,066 A | 11/1973 | Clark et al. | |
| 4,419,407 A | 12/1983 | Piccirilli et al. | |
| 4,477,641 A | 10/1984 | Matsumoto | |
| 4,877,854 A * | 10/1989 | Hattori | ................. C08L 83/12 528/15 |
| 5,026,761 A | 6/1991 | Takagi et al. | |
| 5,658,674 A | 8/1997 | Lorenzetti et al. | |
| 5,674,569 A | 10/1997 | Ohsugi et al. | |
| 5,741,552 A | 4/1998 | Takayama et al. | |
| 5,783,311 A | 7/1998 | Lorenzetti et al. | |
| 6,807,831 B2 * | 10/2004 | Roth | ................. D04B 35/02 66/123 |
| 7,622,533 B2 * | 11/2009 | Lee | .................. C08G 65/33389 525/328.2 |
| 2005/0042463 A1 | 2/2005 | Anderson et al. | |
| 2006/0021888 A1 | 2/2006 | Andre et al. | |
| 2006/0024493 A1 | 2/2006 | Jones et al. | |
| 2006/0099346 A1 | 5/2006 | Martin et al. | |
| 2007/0137524 A1 | 6/2007 | Kang et al. | |
| 2007/0254167 A1 | 11/2007 | Qiu et al. | |
| 2008/0021153 A1 | 1/2008 | Jeon et al. | |
| 2008/0289761 A1 * | 11/2008 | Bosshard | ............. C08G 18/165 156/331.4 |
| 2012/0214925 A1 | 8/2012 | Gubbels et al. | |
| 2014/0011009 A1 * | 1/2014 | Fish | ................. B05D 3/007 428/220 |
| 2016/0194455 A1 * | 7/2016 | Mateu | .................. C08K 5/01 528/26 |

FOREIGN PATENT DOCUMENTS

| | | |
|---|---|---|
| CA | 2000783 | 4/1990 |
| CA | 2471054 | 12/2004 |
| CN | 1036279 | 10/1997 |
| CN | 1376187 | 10/2002 |
| CN | 101168621 | 4/2008 |
| CN | 101619181 | 1/2010 |
| CN | 102002166 | 7/2012 |
| CN | 102898945 | 1/2013 |
| CN | 104768746 | 7/2015 |

(Continued)

OTHER PUBLICATIONS

Lewis et al., PLatinum Catalyst Used in the Silicones Industry, 1997, Platinum Metals Revised, vol. 41, No. 2, p. 66 (Year: 1997).*

(Continued)

*Primary Examiner* — Dah-Wei D. Yuan
*Assistant Examiner* — Andrew J Bowman
(74) *Attorney, Agent, or Firm* — Pauly, DeVries Smith & Deffner LLC

(57) ABSTRACT

The present disclosure provides for a coating composition system suitable for forming a stain resistant and soft tactile texture coating onto a variety of substrate materials including plastic materials, metal materials, ceramic materials, and concrete materials. The coating composition system can be cured under mild curing conditions, and provides the resulting coating with excellent properties in terms of adhesion to the substrates, strength, and abrasion resistance. The present disclosure also provides for a method for preparing the coating composition system, and the use thereof.

8 Claims, No Drawings

(56) References Cited

FOREIGN PATENT DOCUMENTS

| | | | |
|---|---|---|---|
| EP | 0520466 | 4/1993 | |
| EP | 1204708 | 5/2002 | |
| EP | 2009059 | 10/2010 | |
| EP | 2295512 | 3/2012 | |
| JP | H04353576 | 12/1992 | |
| JP | H10298488 | 11/1998 | |
| JP | 11349897 | 12/1999 | |
| JP | 2001152095 | 6/2001 | |
| JP | 2005296697 | * 10/2005 | ............ B05D 7/24 |
| JP | 2013508493 | 3/2013 | |
| WO | 0109259 | 2/2001 | |
| WO | 2006072080 | 7/2006 | |
| WO | 2007123379 | 11/2007 | |
| WO | 2008107396 | 9/2008 | |
| WO | 2012089827 | 7/2012 | |
| WO | 2012099305 | 7/2012 | |
| WO | 2015118158 | 8/2015 | |
| WO | 2018119582 | 7/2018 | |

OTHER PUBLICATIONS

"Office Action," for Korean Patent Application No. 1020197018474 (corresponding to our file) dated Dec. 14, 2020 (4 pages) English Summary Only.

"International Search Report and Written Opinion," for PCT Application No. PCT/CN2016/112126 (corresponding to our file) dated Aug. 30, 2017 (13 pages).

* cited by examiner

COATING COMPOSITION SYSTEM, THE PREPARATION METHOD, AND THE USE THEREOF

CROSS-REFERENCE TO RELATED APPLICATIONS

This application is a national stage application under 35 U.S.C. 371 of International Patent Application Serial No. PCT/CN2016/112126, entitled "A COATING COMPOSITION SYSTEM, THE PREPARATION METHOD, AND THE USE THEREOF," filed Dec. 26, 2016, the disclosure of which is incorporated herein by reference.

FIELD OF THE TECHNOLOGY

This disclosure relates to a coating composition system for forming a complex coating structure including a primer coating layer and a top coating layer onto a substrate, including a liquid silicone rubber coating composition system for forming a stain resistant and soft tactile texture complex coating structure, and its preparation method and application in consumer electrics, automobile industry and other industries.

BACKGROUND

Plastics and metal materials are widely used in consumer electrics, automobile industry and other industries such as architecture. They are made into housings, cases, shells, covers, hulls of a lot of subjects like computers, phones, home appliances, automobile parts, and walls of buildings. Typical plastic materials include polycarbonate (PC), acrylonitrile butadiene styrene (ABS) copolymer, polymethyl methacrylate (PMMA), polyamide (PA), glass fibre and/or carbon fibre reinforced plastics, and soft plastic materials such as thermal plastic polyurethane (TPU), etc. Typical metals substrates include aluminium, steel, anodized aluminium oxide (AAO), aluminium-magnesium alloy, etc. The materials as a substrate usually need to be covered with a coating for better property or additional protection. For example, coatings with tactile texture are required by customers in many industries.

Soft resins have been used as the main material in coating compositions to provide the resulting coatings with soft tactile texture. Typical soft resins include polyester polyols, polyurethane polyols, polyurethane dispersions, acrylic latex etc. The soft resin system may be solvent based or water based. For example, WO201289827 discloses a polyurethane soft touch coating composition characterized in that it includes the reaction product of (A) a non-hydrolysable polyol binder, and (B) an organic polyisocyanate.

Elastic powders have been also used in coating compositions to provide the resulting coatings with soft feel and matting effects. Typical elastic powders include silicone rubber powders or microspheres, microspheres of expansible materials, etc. for example, US20060021888 discloses a coating composition wherein silicone rubber particles are added to a traditional resin coating system to obtain a coating with soft tactile texture and antiglare effects.

By including soft resins or elastic powders, the coatings are provided with soft tactile texture and thus have been widely used in the coating industry. Due to their poor stain resistance property, however, the practical application has been limited. Especially for applications on dark color substrates, it is normally impractical to use coatings with soft resins or elastic powders, as stain marks are more obvious in a dark color background.

There have been approaches to improve the stain resistant performance of a traditional soft tactile texture coating. US20070137524 discloses a new resin system of polybutadiene polyol and polyolefinic acid. It is used in soft feel coating compositions, to increase discoloration resistance, heat resistance, yellowing resistance and anti-fouling properties of the resulting coatings. Although the composition achieves better performance upon modifications, the stain resistance of the resulting coatings is still not satisfactory.

Among different coatings, silicone rubber coatings are frequently used in varies of industries, due to their good electric insulation, physical strength and elasticity, soft feel, stain resistance etc. The silicone rubber systems are mainly based on two reaction mechanisms: condensation reaction and addition reaction. The former is a reaction between hydroxyl silicone oils with different silanes, and the latter is a reaction between vinyl silicone oils with active hydrogen silicone oils. Both of the two silicone rubber systems are widely used in coating industry.

CN1036279 discloses a colourful silicone elastic coating for optical fiber protection and label materials for ceramic and metals. The composition includes methyl vinyl polysiloxane, vinyl MQ reinforcing agent, organohydrogenpolysiloxane, platinum catalyst, stabilizer, and pigments. Based on a thermal cure system, the coating composition can be cured at a curing temperature as high as from 430° C. to 480° C.

Silicone rubbers may also be used for fabrics, textiles and leathers because of their heat and weather resistance, water repellence, softness, cohesion, flexibility, etc. EP2009059 discloses a liquid silicone rubber coating composition for curtain airbags. The coating composition including (A) an organopolysiloxane containing siliconbonded alkenyl radicals, (B) an organohydrogenpolysiloxane containing Si—H radicals, (C) an addition reaction catalyst, (D) finely divided silica, (E) an organosilicon compound containing epoxy and alkoxy radicals, (F) an organic titanium, zirconium or aluminum compound, and (G) a silanol-containing silane or siloxane compound is coated on a surface of an airbag base fabric and cured to form a rubber coating layer thereon.

However, there have been technical issues regarding stain resistant property and soft tactile texture of silicone rubber coatings. In some occasions, coatings need to have both good stain resistant property and soft tactile texture, but this can hardly be achieved with existing silicone rubber formulations, as soft tactile texture normally reduces stain resistant property. Another technical issue of silicone rubber coatings is the adhesion to different substrates. Especially for specific substrate materials like plastics and metals, normal silicone rubber coatings are known to have poor adhesion, and thus are limited in practical use.

SUMMARY

Aspects herein relate to a coating composition system for forming a stain resistant and soft tactile texture coating onto a substrate. In an embodiments, the coating composition system includes a first composition having a hydroxyl resin selected from one or more of the group including alkyd resins, acrylic resins, polyester resins, polyurethane resins, epoxy resins, and modified silicone resins and a hardener resin having functional groups which react with hydroxyl groups of the hydroxyl resin. The coating composition system can further include a second composition including an alkenyl containing polysiloxane of formula (I):

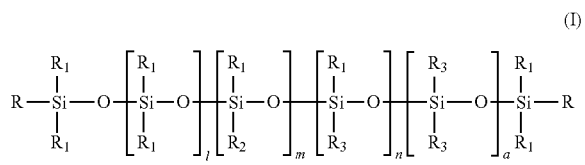

(I)

where R represents an alkyl group having 1 to 8 carbon atoms, or an alkenyl group having 2 to 10 carbon atoms; $R_1$ and $R_3$ each independently represents an alkyl group having 1 to 8 carbon atoms; $R_2$ represents an alkenyl group having 2 to 10 carbon atoms; $l+m+n+a$ is within the range from 200 to 15000. The second composition can also include a Si—H bond containing polysiloxane of formula (II):

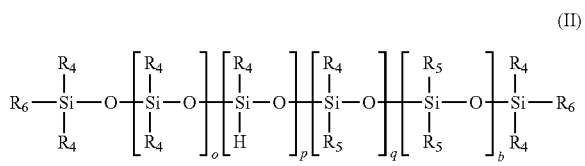

(II)

where $R_4$ and $R_5$ each independently represents an alkyl group having 1 to 8 carbon atoms; $R_6$ represents an alkyl group having 1 to 8 carbon atoms, or H; $o+p+q+b$ is within the range from 5 to 500. The coating composition system can further include a catalyst selected from one or more of the group including platinum compounds, palladium compounds, rhodium compounds and ruthenium compounds.

In an embodiment, a molar ratio of hydroxyl groups of the hydroxyl resin can be excessive over the molar ratio of the functional groups of the hardener in the first composition.

In an embodiment, the hardener of the first composition can be selected from one or more of the group including amino resins, isocyanates, and melamine resins.

In an embodiment, the first composition can further include a catalyst selected from one or more of the group including organic cobalt catalysts, manganese catalysts, and organic tin catalysts.

In an embodiment, the amount of the catalyst in the first composition can be within the range from 0 to 2.5 wt % in relation to the total weight of the hydroxyl resin.

In an embodiment, the first composition can further include an adhesion promoter selected from one or more of the group including epoxy silanes, amino silanes, alkenyl silanes, titanate, zirconate, aluminate, polymers with a hydroxyl value of from 100 to 300 mg KOH/g or an acid value of from 20 to 200 mg KOH/g.

In an embodiment, the amount of the catalyst in the second composition can be within the range from 0.1 to 2.5 wt % in relation to the total weight of the alkenyl containing polysiloxane and the Si—H bond containing polysiloxane.

In an embodiment, the second composition can further include a hydrosilication inhibitor selected from one or more of the group including alkynols and their derivatives, multi-alkenyl polysiloxanes, cyclic alkenyl silanes, amides, and maleates.

In an embodiment, the amount of the hydrosilication inhibitor can be within the range from 0 to 5.0 wt % in relation to the total weight of the alkenyl containing polysiloxane and the Si—H bond containing polysiloxane.

In an embodiment, the second composition can further include a reinforcing agent selected from one or more of the group including silica, mono-functional quad-functional silicone resins, polyhedral oligomeric silsesquioxane, carbon black, and fibres.

In an embodiment, a method for forming a stain resistant and soft tactile texture coating onto a substrate is presented. The method can include forming a primer coating onto the substrate with a first composition, the first composition including a hydroxyl resin selected from one or more of the group including alkyd resins, acrylic resins, polyester resins, polyurethane resins, epoxy resins, and modified silicone resins and a hardener resin having functional groups which react with hydroxyl groups of the hydroxyl resin. The method can include forming a top coating onto the primer coating with a second composition, the second composition including: an alkenyl containing polysiloxane of formula (I):

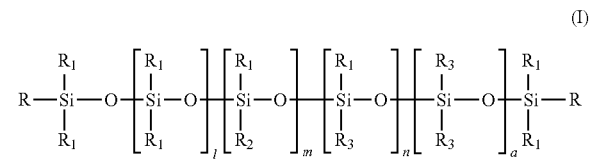

(I)

where R represents an alkyl group having 1 to 8 carbon atoms, or an alkenyl group having 2 to 10 carbon atoms; $R_1$ and $R_3$ each independently represents an alkyl group having 1 to 8 carbon atoms; $R_2$ represents an alkenyl group having 2 to 10 carbon atoms; $l+m+n+a$ is within the range from 200 to 15000. The second composition can further include a Si—H bond containing polysiloxane of the formula (II):

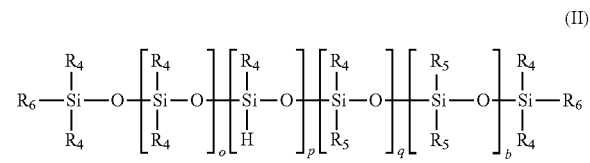

(II)

where $R_4$ and $R_5$ each independently represents an alkyl group having 1 to 8 carbon atoms; $R_6$ represents an alkyl group having 1 to 8 carbon atoms, or H; $o+p+q+b$ is within the range from 5 to 500; and a catalyst selected from one or more of the group including platinum compounds, palladium compounds, rhodium compounds and ruthenium compounds.

In an embodiment, the molar ratio of the hydroxyl groups of the hydroxyl resin is controlled to be excessive over the molar ratio of the functional groups of the hardener in the first composition.

In an embodiment, the hardener of the first composition is selected from one or more of the group including amino resins, isocyanates, and melamine resins.

In an embodiment, a catalyst can be selected from one or more of the group including organic cobalt catalysts, manganese catalysts, and organic tin catalysts is added into the first composition.

In an embodiment, the amount of the catalyst can be controlled to be within the range from 0 to 2.5 wt % in relation to the total weight of the hydroxyl resin.

In an embodiment, an adhesion promoter can be selected from one or more of the group including epoxy silanes, amino silanes, alkenyl silanes, titanate, zirconate, aluminate, polymers with a hydroxyl value of from 100 to 300 mgKOH/g or an acid value of from 20 to 200 mgKOH/g is added into the first composition.

In an embodiment, the catalyst in the second composition can be added in an amount within the range from 0.1 to 2.5 wt % in relation to the total weight of the alkenyl containing polysiloxane and the Si—H bond containing polysiloxane.

In an embodiment, a hydrosilication inhibitor can be selected from one or more of the group including alkynols and their derivatives, multi-alkenyl polysiloxanes, cyclic alkenyl silanes, amides, and maleates is further added into the second composition.

In an embodiment, the amount of the hydrosilication inhibitor can be controlled to be within the range from 0% to 5.0% % in relation to the total weight of the alkenyl containing polysiloxane and the Si—H bond containing polysiloxane.

In an embodiment, the present disclosure includes an article coated with a coating composition system described herein.

In an embodiment, the article can be selected from the group including consumer electronic devices such as mobile phones, tablets, personal computers, laptop computers, electronic readers, music players, computer accessories, televisions, game consoles, global positioning system devices, wearable devices; as well as automotive parts; home appliances, yachts, and aerospace crafts.

DETAILED DESCRIPTION

The present disclosure provides for a coating composition system suitable for forming a stain resistant and soft tactile texture coating onto a variety of substrate materials including plastic materials, metal materials, ceramic materials, and concrete materials. The coating composition system can be cured under mild curing conditions, and provide the resulting coating with excellent properties in terms of adhesion to the substrates, strength, and abrasion resistance. The present disclosure also provides for a method for preparing the coating composition system, and the use thereof.

According to the various embodiments herein, the coating composition system includes two separate coating compositions, wherein the first coating composition is to form a primer coating onto a substrate, and the second coating composition is to form a top coating onto the primer coating. The primer coating serves as a middle layer between the substrate and top coating film, to improve the adhesion of the coating layers to the substrate. During application, the first composition is applied onto a substrate and cured to form a primer coating, the second coating composition is consequently applied onto the primer coating and cured to form a top coating.

The first coating composition according to various embodiments herein includes: a hydroxyl resin, a hardener resin having functional groups which react with hydroxyl groups of the hydroxyl resin, an optional catalyst for the reaction between the resins, an optional adhesion promoter, optional additives, fillers, extenders, pigments and toners.

One or more resins with hydroxyl groups are used as the main ingredient of the first coating composition. Resins that are suitable for use herein include, but are not limited to alkyd resins, acrylic resins, polyester resins, polyurethane resins, epoxy resins, modified silicone resins, etc., the resins can be used alone or in combination.

In addition to the hydroxyl resins, the first coating composition includes one or more hardener resins having functional groups which react with the hydroxyl resins. Resins that are suitable for use herein include, but are not limited to, amino resins, isocyanates, melamine resins, etc. The hardener resins can be selected from poly-isocyanates, dimerisocyanates, trimer-isocyanates, and biuret-isocyanates, etc. The hardener resins can be used alone or in combination.

In a further embodiment, the molar ratio of hydroxyl groups of the hydroxyl resin is excessive over the molar ratio of the functional groups of the hardener resin in the first composition. When the first coating composition is in contact with the second coating composition which will be discussed in later part of the description, the excessive hydroxyl groups may further react with other functional groups in the second coating composition, such as Si—H groups, as shown below:

The reaction between the excessive hydroxyl groups of the first coating composition and the other functional groups in the second coating composition helps to improve the adhesion between coating layers and the substrate.

Different catalysts may be added into the first coating composition, to facilitate the reaction between the resins. The catalysts are selected according to the resin system used in the first coating composition. Catalysts that are suitable for use herein include, but are not limited to, organic cobalt catalysts and manganese catalysts for alkyd resins, organic tin catalysts for polyurethane resins.

Adhesion promoters are added into the first coating composition to enhance the adhesion between the coating layers and the substrate. Adhesion promoters that are suitable for use herein include, but are not limited to, silanes with functional groups, such as epoxy silanes, amino silanes, and alkenyl silanes; organic metal compounds, such as titanates, zirconates, aluminates; resins with a hydroxyl value of from 100 mgKOH/g to 300 mgKOH/g, an acid value of from 20 mgKOH/g to 200 mgKOH/g, or phosphate resins.

According to one embodiment, different additives can be further added into the first coating composition, such as levelling agent, defoaming agent etc. In some embodiments, fillers, extenders, pigments and toners can also be added into the first coating composition. The addition of these materials helps to, for instance, reduce the cost, provide the coating film with desired colour effects. It should be noticed that these materials are not necessarily added into the first coating composition. Fillers and extenders include, but are not limited to, $CaCO_3$, talc powder, $BaSO_4$, mica powder, kaolin powder, glass powder, etc. Pigments and toners include both inorganic pigments and organic pigments which are commonly used in coating industry. In order to provide the resulting coating film with a metal like visual effect or pearl like visual effect, metal powder and pearl powders can also be added into the first coating composition.

There is no special requirement or limitation to solvents used in the first coating composition. Generally, solvents used in coating and paint industry, such as alcohols, ethers, esters, ketones, alkanes, aromatic hydrocarbons, or a combination there of, are suitable for use herein as well.

The second coating composition according to various embodiments herein includes: an alkenyl containing polysiloxane, a Si—H bond containing polysiloxane, a hydrosilylation catalyst, an optional reinforcing agent, an optional reaction inhibitor, optional matting agents, haptic agents, fillers, extenders, and pigments.

The curing mechanism of the second coating composition is based on an addition reaction curing process, wherein hydrosilylation takes place between the alkenyl groups of the alkenyl containing polysiloxane and the Si—H groups of the Si—H bond containing polysiloxane, at the presence of an organic precious metal catalyst.

The alkenyl containing polysiloxane suitable for use in various embodiments herein is shown as the formula (I) below

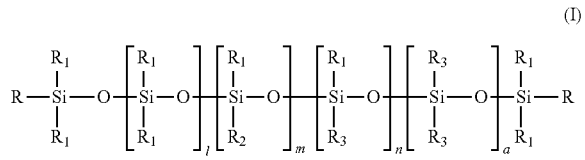

(I)

wherein R represents an alkyl group having 1~8 carbon atoms, or an alkenyl group having 2~10 carbon atoms, which may be selected from, for example, methyl, ethyl, butyl, phenyl, etc., and vinyl, allyl, buyenyl, pentenyl, hexenyl, heptenyl, etc., or in some embodiments R is methyl or vinyl; $R_1$ and $R_3$ each independently represents an alkyl group having 1~8 carbon atoms, which may be selected from, for example, methyl, ethyl, butyl, phenyl, etc., or in some embodiments $R_1$ and $R_3$ are methyl; $R_2$ represents an alkenyl group having 2~10 carbon atoms, which may be selected from, for example, vinyl, allyl, buyenyl, pentenyl, hexenyl, heptenyl groups, etc., or in some embodiments $R_2$ is vinyl group; the sum of l+m+n+a is not less than 200, or in some embodiments not less than 500, and meanwhile the sum of l+m+n+a is not greater than 5000, or in some embodiments not greater than 2000.

In a further embodiment, the alkenyl containing polysiloxane is selected such that the viscosity of the alkenyl containing polysiloxane is not less than 1000 Cp at 25° C., or in some embodiments not less than 5,000 Cp at 25° C., and meanwhile not greater than –500,000 Cp at 25° C., or in some embodiments not greater than 100,000 cP at 25° C. Unless otherwise specified, said viscosity of the alkenyl containing polysiloxane is measured according to ASTM D2225. It has been observed that alkenyl containing polysiloxanes within the defined ranges helped to improve the strength of resulting coatings. In another embodiment, the alkenyl containing polysiloxane is selected such that the alkenyl content is not less than 0.02 mmol/g, or in some embodiments not less than 0.2 mmol/g, and meanwhile, not greater than 5.0 mmol/g, or in some embodiments not greater than 3.0 mmol/g. It has been observed that alkenyl containing polysiloxanes within the defined ranges helped to improve the strength and tactile texture of the resulting coatings. Specifically, alkenyl containing polysiloxanes with an alkenyl content lower than 0.02 mmol/g resulted in soft coating layers with poor strength, and alkenyl containing polysiloxanes with an alkenyl content higher than 5.0 mmol/g resulted in hard coating layers with little soft feel and tactile texture.

The Si—H bond containing polysiloxane suitable for use in herein is shown as the formula (II) below

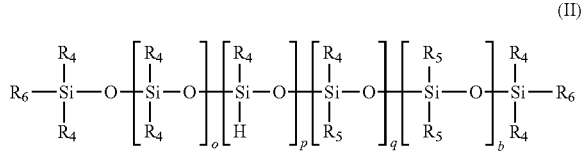

(II)

wherein $R_4$ and $R_5$ each independently represents an alkyl group having 1~8 carbon atoms, which may be selected from, for example, methyl, ethyl, butyl, phenyl, etc., or in some embodiments $R_4$ and $R_5$ are methyl; $R_6$ represents an alkyl group having 1~8 carbon atoms, or H; the sum of o+p+q+b is not less than 5, and not greater than 500;

In a further embodiment, the Si—H bond containing polysiloxane is selected such that its viscosity is not less than 10 cP at 25° C., or in some embodiments not less than 20 cP at 25° C., and meanwhile not greater than 1000 cP at 25° C., or in some embodiments not greater than 500 cP at 25° C. It has been observed that Si—H bond containing polysiloxanes out of the defined range could hardly provide the resulting coatings with satisfying strength. In another embodiment, Si—H bond containing polysiloxane is selected such that its active hydrogen content is not less than 1.0 mmol/g, or in some embodiments not less than 5 mmol/g, and meanwhile not greater than 16.0 mmol/g, or in some embodiments not greater than 10 mmol/g. It has been observed that Si—H bond containing polysiloxanes with an active hydrogen content lower than 1.0 mmol/g resulted in soft coating layers with poor strength, and that Si—H bond containing polysiloxanes with an active hydrogen content higher than 16.0 mmol/g resulted in brittle coating layers with poor strength.

According to one embodiment, a reinforcing agent is added into the second coating composition to further enhance the strength of resulting coatings. Generally, the reinforcing agent selected from one or more of the group including of silica, mono-functional auad-functional silicone resins (MQ silicone resins), polyhedral oligomeric silsesquioxane (POSS), carbon black, and fibers.

As an option, any silica material containing $SiO_2$ can be used as the reinforcing agent of the second coating composition in accordance with various embodiments herein. Preferably the silica material is selected from fumed silica, precipitated silica and quartz powders, which can be used alone or in combination. In some embodiments, silica material is selected from fumed silicas which have gone through surface treatment with silanes. In a further embodiment, the silica material is selected such that its BET surface area is between 500-400 $m^2/g$, or in some embodiments between 150-300 $m^2/g$, its primary particle size is between 5-50 nm, and its average particle size is below 20 um, or in some embodiments below 10 um.

MQ silicone resins may also be added as the reinforcing agent into the second coating composition. When used herein, MQ silicone resins are meant to represent a broad range of hydrolytic condensation products of mono-functional silane (M) and Quad-functional silane (Q). Due to their three-dimensional network structure, MQ silicone resins may provide the resulting coatings with outstanding properties such as high hardness, antifriction, weathering ageing resistance, etc. and may help reinforce the resulting coatings. There is no special requirement or limitation to MQ resins for use as the reinforcing agent in the second coating composition in accordance with various embodiments herein. In some embodiments, the MQ resins contain alkenyl groups and active hydrogen groups.

As another option, reinforcing agents like POSS, carbon black, fibers, etc., may also be used alone or in combination with the above mentioned silica materials and MQ silicone resins as the reinforcing agent in the second coating composition in accordance with various embodiments herein.

To facilitate the hydrosilylation reaction between the alkenyl containing polysiloxane and the Si—H bond containing polysiloxane, addition reaction catalyst is further added into the second composition. According to the various embodiments herein, the addition reaction catalyst is not particularly limited as long as it promotes hydrosilylation reaction between an alkenyl group and a Si—H group. Catalysts that are suitable for use herein are selected from, but not limited to, platinum compounds, palladium compounds, rhodium compounds, and ruthenium compounds, wherein platinum compounds. In order to make the film to cure well at mild conditions, for instance, 0.5-2.0 hours at 70-100° C., an effective amount of the catalyst is between 0.1% to 2.5% in relation to the total weight of silicones (~20-500 ppm Pt), or in some embodiments between 0.25-1.5% in relation to the total weight of silicones (~50-300 ppm Pt). It has been observed that, when the amount of catalyst was lower than 0.1%, for the coating composition could be hardly well cured at low temperature, and the resulting coating strength was bad. When the amount of catalyst was higher than 2.5%, the hydrosilylation reaction was conducted at a fast rate, and thus impacts the pot life for application.

According to one embodiment, a reaction inhibitor is further added into the second coating composition, to adjust the reaction speed of hydrosilylation reaction, which is usually fast even at room temperature. In order to prolong the pot life of the second coating composition, suitable amount of inhibitor is added into the second coating composition in accordance with various embodiments herein. Hydrosilication inhibitors that are suitable for use herein are selected from, but not limited to, alkynols and the derivatives thereof, multi alkenyl polysiloxanes, cyclic alkenyl silanes, amides, maleates, etc. In some embodiments, multi vinyl polysiloxane and cyclic vinyl silanes are suitable as they are more compatible with silicone rubber. Suitable amount of the reaction inhibitor is about 0.5%-5.0% in relation to the total weight of silicones.

According to one embodiment, matting agents and/or haptic agents are further added into the second coating composition, to matt the film and make it feel smooth and slippery. Matting agents and/or haptic agents include, but are not limited to, silicas such as fumed silica and precipitated silica, wax powders such as PE wax, PP wax, PTFE wax, polyamide wax, etc. These matting agents and/or haptic agents can be used alone or in combination.

According to one embodiment, fillers, extenders, pigments and toners can also be added into the second coating composition. The addition of these materials helps to, for instance, reduce the cost, provide the coating film with desired colour effects. It should be noticed that these materials are not always necessary for the second coating composition. Fillers and extenders include, but are not limited to, $CaCO_3$, talc powder, $BaSO_4$, mica powder, kaolin powder, glass powder, etc. Pigments and toners include both inorganic pigments and organic pigments which are commonly used in coating industry. In order to provide the resulting coating film with a metal like visual effect or pearl like visual effect, metal powder and pearl powders can also be added into the second coating composition.

There is no special requirement or limitation to solvents used in the second coating composition. Generally, solvents used in coating and paint industry, such as alcohols, ethers, esters, ketones, alkanes, aromatic hydrocarbons, or a combination there of, are suitable for use in the herein as well.

In another aspect, a method for preparing the hybrid coating composition system according to various embodiments herein is provided, which includes the steps of:

Preparation of the First Coating Composition

Part 1—coating: in a kettle, add suitable amount of solvent and start agitation, then add resins, fillers and pigments, additives one by one during agitation at medium speed, ca. 300-500 RPM, for about 10-30 minutes respectively.

Raise the speed to about 2000-3000 RPM and disperse the mixture for about 1 hour, or for better dispersion, sand mill for about 10-30 minutes could be another choice. The viscosity is between 60-100 KU for better dispersion, and during the agitation, cooling water may be needed to cool down the mixture. If no powder is used in the system, go to next step directly.

After dispersion or sand milling, low the speed to about 300-500 RPM and add the catalyst and residual solvents one by one during agitation and agitate for 10-30 minutes respectively. Then stop agitation and package the coating.

Part 2—hardener: in another kettle, add suitable amount of solvent and start agitation, then add hardener resins and agitation for about 10-30 minutes at medium speed, ca. 300-500 RPM. Then stop agitation and package the hardener.

Preparation of the Second Coating Composition

Part 1—coating: in a kettle, add suitable amount of solvent and start agitation, then add alkenyl-containing polysiloxanes, reinforcing agent, matting agents and haptic agents, fillers and pigments, additives one by one during agitation at medium speed, ca. 300-500 RPM, for about 10-30 minutes respectively.

Then raise the speed to about 2000-3000 RPM and disperse the mixture for about 1 hour, or for better dispersion, sand mill for about 10-30 minutes could be another choice. The viscosity is between 60-100 KU for better dispersion, and during the agitation, cooling water may be needed to cool down the mixture.

After dispersion or sand milling, low the speed to about 300-500 RPM and add the inhibitors, catalyst and residual solvents one by one during agitation and agitate for 10-30 minutes respectively. Then stop agitation and package the coating.

Part 2—hardener: in another kettle, add suitable amount of solvent and start agitation, then add hydrogen methyl polysiloxanes and agitation for about 10-30 minutes at medium speed, ca. 300-500 RPM. Then stop agitation and package the hardener.

In another aspect, the application method of the hybrid coating composition system according to various embodiments is provided, which includes the steps of:

Application of the First Coating Composition

Mix part 1 and part 2 in ratio, hydroxyl groups is excessive because a little more hydroxyl groups is needed to react with the topcoat components. Then dilute the mixture with the above mentioned solvents to suitable viscosity. The diluted coating sample could applied on the primer by methods of spray coating, brush coating, dip coating, spin coating, roll coating, curtain coating and shower coating, etc. Spray coating is utilized for consumer electronics and automobiles industry. Before application, the substrate maybe need some surface cleaning with alcohols or surface treatment like sanding or acid/alkali washing, etc.

Put the coated parts in the oven, the curing condition is 5-30 minutes at 70-100 C.

The dry film thickness is between 5-100 um, or in some embodiments 10-30 um, or in some embodiments 15-20 um.

Application of the Second Coating Composition

Mix part 1 and part 2 in ratio, for better curing the ration of alkenyl groups in part 1 to Si—H groups in part 2 can be between 1:1 to 1:3, because there are some side reactions for Si—H, and furthermore, a little more Si—H is needed to react with the primer. Then dilute the mixture with the above mentioned solvents to suitable viscosity. The diluted coating sample could applied on the primer by methods of spray coating, brush coating, dip coating, spin coating, roll coating, curtain coating and shower coating, etc.

Put the coated parts in the oven, for plastic substrates, the curing condition could be 0.5-2 hours at 70-100 C. For metal substrates, the curing condition could be 0.5-2 hours at 70-100 C or 5-30 minutes at 150-180 C.

The dry film thickness is between 10-100 um, or in some embodiments 30-70 um, or in some embodiments 40-60 um.

In yet another aspect, uses of the hybrid coating composition system according to various embodiments herein are provided. The hybrid coating composition system according to the present disclosure is suitable for use in, for example, consumer electronic devices. Specifically, the devices include but are not limited to mobile phones, tablets, personal computers, laptop computers, electronic readers, music players, computer accessories (monitors, mouse, keyboards, portable hard disks, printers), televisions, game consoles, global positioning system devices, wearable devices, and the like. Other applications include automotive interior and exterior parts, and home appliances.

EXAMPLES

Various embodiments herein will be elucidated with reference to the following examples. These examples are intended to be illustrative, but are not to be construed as limiting in any manner the scope thereof.

In the following examples, formulation changes in terms of content of functional groups, molecular weight, reinforcing agents, amount of catalyst, etc., were tested and the results were shown below.

Examples 1-4: Test of Vinyl Content and Active Hydrogen Content of Silicone

Coating composition systems with silicones having different vinyl contents and hydrogen contents were prepared according to table 1, respectively. They were applied onto a substrate of polycarbonate and acrylonitrile butadiene styrene copolymer, and then cured for further tests. It was seen that the listed formulas all achieved good test results, see table 2.

TABLE 1

Examples to study the Impact of vinyl content and active hydrogen content of silicone

| | Example 1 | Example 2 | Example 3 | Example 4 |
|---|---|---|---|---|
| Topcoat System | | | | |
| Vinyl methyl polysiloxane-50000 cP, vinyl content 0.5 wt % (~0.2 mmol/g) | 100.0 | N/A | N/A | N/A |
| Vinyl methyl polysiloxane-50000 cP, vinyl content 2 wt % (~0.8 mmol/g) | N/A | 100.0 | N/A | N/A |
| Vinyl methyl polysiloxane-50000 cP, vinyl content 5 wt % (~2 mmol/g) | N/A | N/A | 100.0 | N/A |
| Vinyl methyl polysiloxane-50000 cP, vinyl content 8 wt % (~0.32 mmol/g) | N/A | N/A | N/A | 100.0 |
| Hydrogen methyl polysiloxane-50 cP, active hydrogen content 0.5 wt % (~5 mmol/g) | 10.0 | N/A | N/A | N/A |
| Hydrogen methyl polysiloxane-50 cP, active hydrogen content 0.8 wt % (~8 mmol/g) | N/A | 20.0 | N/A | N/A |
| Hydrogen methyl polysiloxane-50 cP, active hydrogen content 1.6 wt % (~16 mmol/g) | N/A | NA | 30.0 | 50.0 |
| Reinforcing agent - fumed silica | 15.0 | 15.0 | 15.0 | 15.0 |
| Inhibitor | 1.5 | 2.0 | 2.0 | 2.0 |
| Platinum Catalyst | 1.0 | 1.0 | 1.0 | 1.0 |
| Additives: matting agent | 10.0 | 10.0 | 10.0 | 10.0 |
| Additives: slippery agent, wax powder | 2.0 | 2.0 | 2.0 | 2.0 |
| Solvents | 200.0 | 200.0 | 200.0 | 200.0 |
| Primer system | | | | |
| Resins: polyester polyols | 100.0 | 100.0 | 100.0 | 100.0 |
| Hardeners: isocyanate | 15.0 | 15.0 | 15.0 | 15.0 |
| Adhesion promoters/resins | 20.0 | 20.0 | 20.0 | 20.0 |
| Catalyst: Tin compound | 1.0 | 1.0 | 1.0 | 1.0 |
| Additives | 1.0 | 1.0 | 1.0 | 1.0 |
| Solvents | 150.0 | 150.0 | 150.0 | 150.0 |

TABLE 2

Test results of Example 1-4

| | Example 1 | Example 2 | Example 3 | Example 4 |
|---|---|---|---|---|
| Appearance | Low gloss, soft feel, smooth and slippery | Low gloss, soft feel, smooth and slippery | Low gloss, soft feel, smooth and slippery | Low gloss, soft feel, smooth and slippery |
| Cross-cut Adhesion, ASTM 3359; 1.0 mm × 1.0 mm | 5B | 5B | 5B | 5B |

TABLE 2-continued

Test results of Example 1-4

|  | Example 1 | Example 2 | Example 3 | Example 4 |
|---|---|---|---|---|
| Abrasion-RCA 175 g, 250 cycles | Pass | Pass | Pass | Pass |
| Abrasion-Alcohol 250 g, 250 rubs | Pass | Pass | Pass | Pass |
| MEK resistance, 23° C., 3 minutes | Pass | Pass | Pass | Pass |
| Hot water resistance, 0.5 hour at 95° C. | Pass | Pass | Pass | Pass |
| Humidity/Temperature test, 80 C., 95% RH, 96 hours | Pass | Pass | Pass | Pass |
| Thermal shock, −40° C./50% and 85° C./75% 48 cycles, 4 days | Pass | Pass | Pass | Pass |
| QUV, ASTM G154 UVA-340, 0.71 W/m2/nm ultraviolet lamp and 60° C., 96 hours | Pass | Pass | Pass | Pass |
| Impact resistance, 1 kg, 50 cm | Pass | Pass | Pass | Pass |
| Artificial sweat resistance | Pass | Pass | Pass | Pass |
| Permanent mark pen, 1 hour at 23° C. | Pass | Pass | Pass | Pass |
| Cosmetics-Foundation cream | Pass | Pass | Pass | Pass |
| Cosmetics-Lipstick | Pass | Pass | Pass | Pass |
| Cosmetics-hand cream, 1 hour at 23° C. | Pass | Pass | Pass | Pass |
| Cosmetics-sunscreen lotion, 1 hour at 23° C. | Pass | Pass | Pass | Pass |
| Coffee, 1 hour at 23° C. | Pass | Pass | Pass | Pass |
| Beer, 1 hour at 23° C. | Pass | Pass | Pass | Pass |
| Red wine, 1 hour at 23° C. | Pass | Pass | Pass | Pass |
| Mustard, 1 hour at 23° C. | Pass | Pass | Pass | Pass |
| Ketchup, 1 hour at 23° C. | Pass | Pass | Pass | Pass |
| Coca-cola, 1 hour at 23° C. | Pass | Pass | Pass | Pass |
| Olive Oil, 1 hour at 23° C. | Pass | Pass | Pass | Pass |

Examples 5-8, Test of Mw and/or Viscosity of Vinyl Silicone and Hydrogen Silicone Coating composition systems with vinyl silicones and hydrogen silicones having different molecular weights or viscosities were prepared according to table 3, respectively. They were applied onto a substrate of polycarbonate and acrylonitrile butadiene styrene copolymer, and then cured for further tests. It was seen that the listed formulas all achieved good test results, see table 4.

TABLE 3

Examples to study the Impact of Mw or viscosity of vinyl silicone and hydrogen silicone

|  | Example 5 | Example 6 | Example 7 | Example 8 |
|---|---|---|---|---|
| Topcoat |  |  |  |  |
| Vinyl methyl polysiloxane-5000 cP, vinyl content 2 wt % (~0.8 mmol/g) | 100.0 | NA | NA | NA |
| Vinyl methyl polysiloxane-20000 cP, vinyl content 2 wt % (~0.8 mmol/g) | NA | 100.0 | NA | NA |
| Vinyl methyl polysiloxane-100000 cP, vinyl content 5 wt % (~2 mmol/g) | NA | NA | 100.0 | NA |
| Vinyl methyl polysiloxane-300000 cP, vinyl content 8 wt % (~0.32 mmol/g) | NA | NA | NA | 100.0 |
| Hydrogen methyl polysiloxane-20 cP, active hydrogen content 0.8 wt % (~8 mmol/g) | 20.0 | NA | NA | NA |
| Hydrogen methyl polysiloxane-50 cP, active hydrogen content 0.8 wt % (~8 mmol/g) | NA | 20.0 | NA | NA |
| Hydrogen methyl polysiloxane-100 cP, active hydrogen content 0.8 wt % (~8 mmol/g) | NA | NA | 20.0 | NA |
| Hydrogen methyl polysiloxane-500 cP, active hydrogen content 0.8 wt % (~8 mmol/g) | NA | NA | NA | 20.0 |
| Reinforcing agent - fumed silica | 15.0 | 15.0 | 15.0 | 15.0 |
| Inhibitor | 2.0 | 2.0 | 2.0 | 2.0 |
| Platinum Catalyst | 1.0 | 1.0 | 1.0 | 1.0 |

TABLE 3-continued

Examples to study the Impact of Mw or viscosity of vinyl silicone and hydrogen silicone

|  | Example 5 | Example 6 | Example 7 | Example 8 |
|---|---|---|---|---|
| Additives: matting agent | 10.0 | 10.0 | 10.0 | 10.0 |
| Additives: silipery agent, wax powder | 2.0 | 2.0 | 2.0 | 2.0 |
| Solvents | 200.0 | 200.0 | 200.0 | 200.0 |
| Primer system |  |  |  |  |
| Resins: polyester polyols | 100.0 | 100.0 | 100.0 | 100.0 |
| Hardeners: isocyanate | 15.0 | 15.0 | 15.0 | 15.0 |
| Adhesion promoters/resins | 20.0 | 20.0 | 20.0 | 20.0 |
| Catalyst: Tin compound | 1.0 | 1.0 | 1.0 | 1.0 |
| Additives | 1.0 | 1.0 | 1.0 | 1.0 |
| Solvents | 150.0 | 150.0 | 150.0 | 150.0 |

TABLE 4

Test results of Example 5-8

|  | Example 5 | Example 6 | Example 7 | Example 8 |
|---|---|---|---|---|
| Appearance | Low gloss, soft feel, smooth and slippery | Low gloss, soft feel, smooth and slippery | Low gloss, soft feel, smooth and slippery | Low gloss, soft feel, smooth and slippery |
| Cross-cut Adhesion, ASTM 3359; 1.0 mm × 1.0 mm | 5B | 5B | 5B | 5B |
| Abrasion-RCA 175 g, 250 cycles | Pass | Pass | Pass | Pass |
| Abrasion-Alcohol 250 g, 250 rubs | Pass | Pass | Pass | Pass |
| MEK resistance, 23° C., 3 minutes | Pass | Pass | Pass | Pass |
| Hot water resistance, 0.5 hour at 95 C. | Pass | Pass | Pass | Pass |
| Humidity/Temperature test, 80° C., 95% RH, 96 hours | Pass | Pass | Pass | Pass |
| Thermal shock, −40° C./50% and 85° C./75% 48 cycles, 4 days | Pass | Pass | Pass | Pass |
| QUV, ASTM G154 UVA-340, 0.71 W/m2/nm ultraviolet lamp and 60° C., 96 hours | Pass | Pass | Pass | Pass |
| Impact resistance, 1 kg, 50 cm | Pass | Pass | Pass | Pass |
| Artificial sweat resistance | Pass | Pass | Pass | Pass |
| Permanent mark pen, 1 hour at 23° C. | Pass | Pass | Pass | Pass |
| Cosmetics-Foundation cream | Pass | Pass | Pass | Pass |
| Cosmetics-Lipstick | Pass | Pass | Pass | Pass |
| Cosmetics-hand cream, 1 hour at 23° C. | Pass | Pass | Pass | Pass |
| Cosmetics-sunscreen lotion, 1 hour at 23° C. | Pass | Pass | Pass | Pass |
| Coffee, 1 hour at 23° C. | Pass | Pass | Pass | Pass |
| Beer, 1 hour at 23° C. | Pass | Pass | Pass | Pass |
| Red wine, 1 hour at 23° C. | Pass | Pass | Pass | Pass |
| Mustard, 1 hour at 23° C. | Pass | Pass | Pass | Pass |
| Ketchup, 1 hour at 23° C. | Pass | Pass | Pass | Pass |
| Coca-cola, 1 hour at 23° C. | Pass | Pass | Pass | Pass |
| Olive Oil, 1 hour at 23° C. | Pass | Pass | Pass | Pass |

Examples 9-12 Test of Reinforcing Agent and Matting Silica

Coating composition systems with different reinforcing agents and dosages were prepared according to table 5, respectively. They were applied onto a substrate of polycarbonate and acrylonitrile butadiene styrene copolymer, and then cured for further tests. It was seen that the listed formulas all achieved good test results, see table 6.

TABLE 5

Examples to study the impact of reinforcing agent and matting silica

| | Example 9 | Example 10 | Example 11 | Example 12 |
|---|---|---|---|---|
| Topcoat | | | | |
| Vinyl methyl polysiloxane-50000 cP, vinyl content 0.5 wt % (~0.2 mmol/g) | 100.0 | 100.0 | 100.0 | 100.0 |
| Hydrogen methyl polysiloxane-50 cP, active hydrogen content 0.5 wt % (~5 mmol/g) | 10.0 | 10.0 | 10.0 | 10.0 |
| Reinforcing agent - fumed silica | 30.0 | 5.0 | NA | NA |
| Reinforcing agent - MQ resin | NA | NA | 40.0 | NA |
| Reinforcing agent-Vinyl MQ resin, 1.0% vinyl | NA | NA | NA | 40.0 |
| Inhibitor | 1.5 | 1.5 | 1.5 | 1.5 |
| Platinum Catalyst | 1.0 | 1.0 | 1.0 | 1.0 |
| Additives: matting agent | 5.0 | 30.0 | 10.0 | 10.0 |
| Additives: silipery agent, wax powder | 2.0 | 2.0 | 2.0 | 2.0 |
| Solvents | 200.0 | 200.0 | 200.0 | 200.0 |
| Primer system | | | | |
| Resins: polyester polyols | 100.0 | 100.0 | 100.0 | 100.0 |
| Hardeners: isocyanate | 15.0 | 15.0 | 15.0 | 15.0 |
| Adhesion promoters/resins | 20.0 | 20.0 | 20.0 | 20.0 |
| Catalyst: Tin compound | 1.0 | 1.0 | 1.0 | 1.0 |
| Additives | 1.0 | 1.0 | 1.0 | 1.0 |
| Solvents | 150.0 | 150.0 | 150.0 | 150.0 |

TABLE 6

Test results of Example 9-12

| | Example 9 | Example 10 | Example 11 | Example 12 |
|---|---|---|---|---|
| Appearance | Low gloss, soft feel, smooth and slippery | Low gloss, soft feel, smooth and slippery | Low gloss, soft feel, smooth and slippery | Low gloss, soft feel, smooth and slippery |
| Cross-cut Adhesion, ASTM 3359; 1.0 mm × 1.0 mm | 5B | 5B | 5B | 5B |
| Abrasion-RCA 175 g, 250 cycles | Pass | Pass | Pass | Pass |
| Abrasion-Alcohol 250 g, 250 rubs | Pass | Pass | Pass | Pass |
| MEK resistance, 23° C., 3 minutes | Pass | Pass | Pass | Pass |
| Hot water resistance, 0.5 hour at 95 C. | Pass | Pass | Pass | Pass |
| Humidity/Temperature test, 80 C., 95% RH, 96 hours | Pass | Pass | Pass | Pass |
| Thermal shock, −40° C./50% and 85° C./75% 48 cycles, 4 days | Pass | Pass | Pass | Pass |
| QUV, ASTM G154 UVA-340, 0.71 W/m2/nm ultraviolet lamp and 60° C., 96 hours | Pass | Pass | Pass | Pass |
| Impact resistance, 1 kg, 50 cm | Pass | Pass | Pass | Pass |
| Artificial sweat resistance | Pass | Pass | Pass | Pass |
| Permanent mark pen, 1 hour at 23° C. | Pass | Pass | Pass | Pass |
| Cosmetics-Foundation cream | Pass | Pass | Pass | Pass |
| Cosmetics-Lipstick | Pass | Pass | Pass | Pass |
| Cosmetics-hand cream, 1 hour at 23° C. | Pass | Pass | Pass | Pass |
| Cosmetics-sunscreen lotion, 1 hour at 23° C. | Pass | Pass | Pass | Pass |
| Coffee, 1 hour at 23° C. | Pass | Pass | Pass | Pass |
| Beer, 1 hour at 23° C. | Pass | Pass | Pass | Pass |
| Red wine, 1 hour at 23° C. | Pass | Pass | Pass | Pass |
| Mustard, 1 hour at 23° C. | Pass | Pass | Pass | Pass |
| Ketchup, 1 hour at 23° C. | Pass | Pass | Pass | Pass |
| Coca-cola, 1 hour at 23° C. | Pass | Pass | Pass | Pass |
| Olive Oil, 1 hour at 23° C. | Pass | Pass | Pass | Pass |

Examples 13-16 Test of Platinum Catalyst and Primer

Coating composition systems with different platinum dosages, and primer hardener dosages were prepared according to table 7, respectively. They were applied onto a substrate of polycarbonate and acrylonitrile butadiene styrene copolymer, and then cured for further tests. It was seen that the listed formulas all achieved good test results, see table 8.

TABLE 7

Examples to study the impact of platinum catalyst and primer

| | Example 13 | Example 14 | Example 15 | Example 16 |
|---|---|---|---|---|
| Topcoat | | | | |
| Vinyl methyl polysiloxane-50000 cP, vinyl content 0.5 wt % (~0.2 mmol/g) | 100.0 | 100.0 | 100.0 | 100.0 |
| Hydrogen methyl polysiloxane-50 cP, active hydrogen content 0.5 wt % (~5 mmol/g) | 10.0 | 10.0 | 10.0 | 10.0 |
| Reinforcing agent - fumed silica | 15.0 | 15.0 | 15.0 | 15.0 |
| Inhibitor | 1.5 | 1.5 | 1.5 | 1.5 |
| Platinum Catalyst | 0.2 | 1.0 | 1.0 | 1.0 |
| Additives: matting agent | 10.0 | 10.0 | 10.0 | 10.0 |
| Additives: slippery agent, wax powder | 2.0 | 2.0 | 2.0 | 2.0 |
| Solvents | 200.0 | 200.0 | 200.0 | 200.0 |
| Primer system | | | | |
| Resins: polyester polyols | 100.0 | 100.0 | 100.0 | 100.0 |
| Hardeners: isocyanate | 15.0 | 10.0 | 30.0 | 15.0 |
| Adhesion promoters/resins | 20.0 | 20.0 | 20.0 | 30.0 |
| Catalyst: Tin compound | 1.0 | 1.0 | 1.0 | 1.0 |
| Additives | 1.0 | 1.0 | 1.0 | 1.0 |
| Solvents | 150.0 | 150.0 | 150.0 | 150.0 |

TABLE 8

Test results of Example 13-16

| | Example 13 | Example 14 | Example 15 | Example 16 |
|---|---|---|---|---|
| Appearance | Low gloss, soft feel, smooth and slippery | Low gloss, soft feel, smooth and slippery | Low gloss, soft feel, smooth and slippery | Low gloss, soft feel, smooth and slippery |
| Cross-cut Adhesion, ASTM 3359; 1.0 mm × 1.0 mm | 5B | 5B | 5B | 5B |
| Abrasion-RCA 175 g, 250 cycles | Pass | Pass | Pass | Pass |
| Abrasion-Alcohol 250 g, 250 rubs | Pass | Pass | Pass | Pass |
| MEK resistance, 23° C., 3 minutes | Pass | Pass | Pass | Pass |
| Hot water resistance, 0.5 hour at 95° C. | Pass | Pass | Pass | Pass |
| Humidity/Temperature test, 80 C., 95% RH, 96 hours | Pass | Pass | Pass | Pass |
| Thermal shock, −40° C./50% and 85° C./75% 48 cycles, 4 days | Pass | Pass | Pass | Pass |
| QUV, ASTM G154 UVA-340, 0.71 W/m2/nm ultraviolet lamp and 60° C., 96 hours | Pass | Pass | Pass | Pass |
| Impact resistance, 1 kg, 50 cm | Pass | Pass | Pass | Pass |
| Artificial sweat resistance | Pass | Pass | Pass | Pass |
| Permanent mark pen, 1 hour at 23° C. | Pass | Pass | Pass | Pass |
| Cosmetics-Foundation cream | Pass | Pass | Pass | Pass |
| Cosmetics-Lipstick | Pass | Pass | Pass | Pass |
| Cosmetics-hand cream, 1 hour at 23° C. | Pass | Pass | Pass | Pass |
| Cosmetics-sunscreen lotion, 1 hour at 23° C. | Pass | Pass | Pass | Pass |
| Coffee, 1 hour at 23° C. | Pass | Pass | Pass | Pass |
| Beer, 1 hour at 23° C. | Pass | Pass | Pass | Pass |
| Red wine, 1 hour at 23° C. | Pass | Pass | Pass | Pass |
| Mustard, 1 hour at 23° C. | Pass | Pass | Pass | Pass |
| Ketchup, 1 hour at 23° C. | Pass | Pass | Pass | Pass |
| Coca-cola, 1 hour at 23° C. | Pass | Pass | Pass | Pass |
| Olive Oil, 1 hour at 23° C. | Pass | Pass | Pass | Pass |

What is claimed:

1. A method for forming a stain resistant and soft tactile texture coating onto a substrate, comprising the steps of:
forming a primer coating onto the substrate with a first composition comprising:
a hydroxyl resin selected from one or more of the group consisting of alkyd resins, acrylic resins, polyester resins, polyurethane resins, epoxy resins, and modified silicone resins;
a hardener resin having functional groups which react with hydroxyl groups of the hydroxyl resin;
wherein the molar ratio of the hydroxyl groups of the hydroxyl resin is controlled to be excessive over the molar ratio of the functional groups of the hardener resin;
forming a top coating onto the primer coating with a second composition comprising:
an alkenyl containing polysiloxane of formula (I)

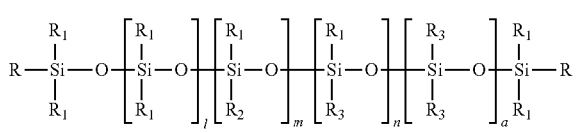

wherein
R represents an alkyl group having 1 to 8 carbon atoms, or an alkenyl group having 2 to 10 carbon atoms;
$R_1$ and $R_3$ each independently represents an alkyl group having 1 to 8 carbon atoms;
$R_2$ represents an alkenyl group having 2 to 10 carbon atoms;
$l+m+n+a$ is within the range from 200 to 15000;
wherein the alkenyl content of the alkenyl-containing polysiloxane is not less than 0.2 mmol/g and not greater than 5.0 mmol/g;
a Si—H bond containing polysiloxane of the formula (II)

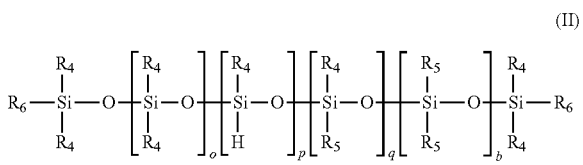

wherein
$R_4$ and $R_5$ each independently represents an alkyl group having 1 to 8 carbon atoms;
$R_6$ represents an alkyl group having 1 to 8 carbon atoms, or H;
$o+p+q+b$ is within the range from 5 to 500;
a catalyst selected from one or more of the group consisting of platinum compounds, palladium compounds, rhodium compounds and ruthenium compounds.

2. The method according to claim 1, wherein the hardener of the first composition is selected from one or more of the group consisting of amino resins, isocyanates, and melamine resins.

3. The method according to claim 1, wherein a catalyst selected from one or more of the group consisting of organic cobalt catalysts, manganese catalysts, and organic tin catalysts is added into the first composition.

4. The method according to claim 3, wherein the amount of the catalyst is controlled to be within the range from 0 to 2.5 wt % in relation to the total weight of the hydroxyl resin.

5. The method according to claim 1, wherein an adhesion promoter selected from one or more of the group consisting of epoxy silanes, amino silanes, alkenyl silanes, titanate, zirconate, aluminate, polymers with a hydroxyl value of from 100 to 300 mgKOH/g or an acid value of from 20 to 200 mgKOH/g is added into the first composition.

6. The method according to claim 1, wherein the catalyst in the second composition is added in an amount within the range from 0.1 to 2.5 wt % in relation to the total weight of the alkenyl containing polysiloxane and the Si—H bond containing polysiloxane.

7. The method according to claim 1, wherein a hydrosilication inhibitor selected from one or more of the group consisting of alkynols and their derivatives, multi-alkenyl polysiloxanes, cyclic alkenyl silanes, amides, and maleates is further added into the second composition.

8. The method according to claim 7, wherein the amount of the hydrosilication inhibitor is controlled to be within the range from 0% to 5.0% % in relation to the total weight of the alkenyl containing polysiloxane and the Si—H bond containing polysiloxane.

* * * * *